Patented Nov. 29, 1932

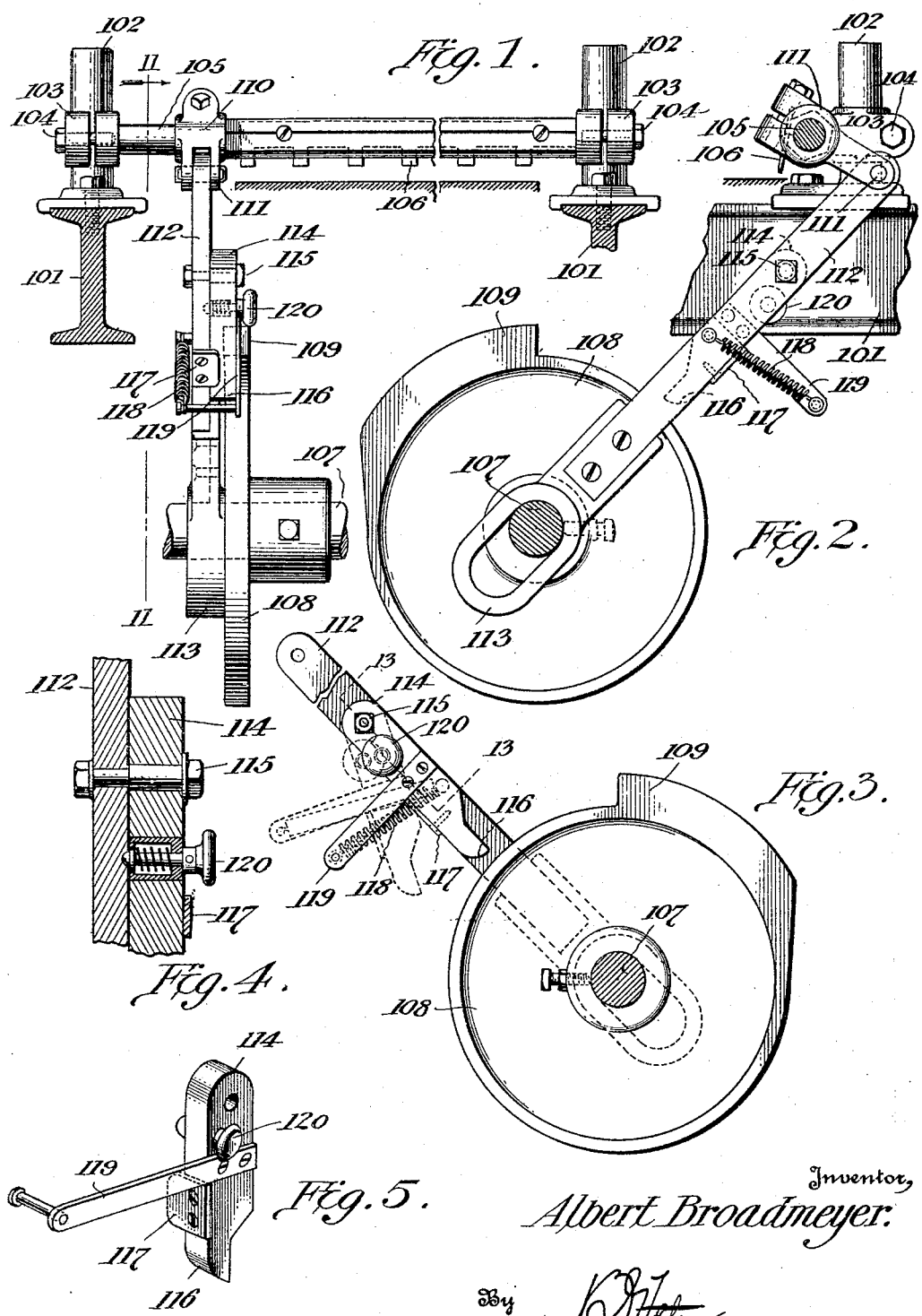

1,889,726

UNITED STATES PATENT OFFICE

ALBERT BROADMEYER, OF HARRISBURG, PENNSYLVANIA, ASSIGNOR TO W. O. HICKOK MANUFACTURING COMPANY, OF HARRISBURG, PENNSYLVANIA, A CORPORATION OF PENNSYLVANIA

OPERATING MECHANISM FOR RULING PEN GATES

Application filed November 19, 1929. Serial No. 408,332.

The object of the present invention is to provide simple and effective mechanism for operating the gate of a ruling machine, said mechanism being so constructed that it can be quickly made ineffective if it is desired to stop the gate at any time without stopping the remainder of the mechanism.

In the accompanying drawing:

Figure 1 is a view in elevation of the gate and the preferred embodiment of the operating means.

Figure 2 is a sectional view on the line 2—2 of Figure 1.

Figure 3 is a view of the reverse side of the operating mechanism to that shown in Figure 2.

Figure 4 is a detail sectional view on the line 4—4 of Figure 3.

Figure 5 is a detail perspective view of the abutment dog.

In the embodiment disclosed portions of the frame bars of a ruling machine are shown at 101. On these bars are mounted posts 102 carrying vertically adjustable slip collars 103 which can be clamped by bolts 104. These collars have outstanding journal boxes in which is mounted a rock shaft 105 and on the rock shaft is fixed the gate 106.

A shaft 107, located below the frame bars 101, has fixed thereto a cam member 108 provided with an extended operating track portion 109. The rock shaft 105 has adjustably fixed thereon a bifurcated crank arm 110, to which is pivoted, as shown at 111, one end of a carrier link 112. The other end of this link has a yoke 113 that is slidably mounted on the shaft 107 alongside the cam member 108.

Pivotally mounted on the link 112 between its said ends is an abutment member in the form of a dog 114. As shown, this dog has the pivot 115 engaging its upper end and the lower end is reduced and beveled as shown at 116, so that when the dog is in line with the link, it will be in the path of the track portion 109 of the cam member. It is stopped in this position by a plate 117 secured to the rear edge of the dog and abutting against the under side of the link. Its position is secured and maintained by means of a coiled spring 118, one end of which is fastened to the link, the other being fastened to the outer end of an arm 119 secured to the dog. This dog furthermore carries a spring-pressed plunger latch 120, which when the dog is swung downwardly or rearwardly, engages behind the edge of the link 112, as indicated in dotted lines in Figure 3. When so positioned and held, the dog is out of the path of the peripheral portion 109 of the cam.

It will be evident therefore that with this construction, as the cam rotates, if the dog 114 is alined with the link, the cam 109 will periodically engage said dog, moving the link longitudinally and swinging the gate to an operative or stop position. If, however, it is desired to stop the operation without stopping the cam 108, it is only necessary to swing the dog to the position shown in dotted lines in Figure 3, whereupon the cam will escape contact with said dog and the gate will remain idle.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with a sheet controlling gate, of a cam member for operating the same, and mechanism operated by the cam and actuating the gate, said mechanism including a movable carrier link having a back and forth movement, an abutment member mounted on and moving the link and movable thereon to and from a position to be engaged by the cam to operate the link and the gate, and means carried solely by the link and abutment member for maintaining the latter both in and out of said cam engaged position.

2. The combination with a sheet controlling gate, of a cam member for operating the same, and mechanism operated by the cam and actuating the gate, said mechanism including a carrier link having a back and forth movement, an abutment member pivoted on the link and movable therewith and also movable thereon to and from a position to be engaged by the cam to operate the link and the gate, and means carried solely by the link and abutment member for maintaining the latter both in and out of said cam engaged position.

3. The combination with a sheet controlling gate, of a cam member for operating the same, mechanism operated by the cam and actuating the gate, said mechanism including a carrier link having a back and forth movement and an abutment member mounted on the link to move therewith and movable on said link to and from a position to be engaged by the cam member, means mounted on the link for automatically urging the abutment member to such position, and means for locking it out of such position.

4. The combination with a sheet controlling gate, of a cam member for operating the same, mechanism operated by the cam and actuating the gate, said mechanism including a carrier link having a back and forth movement and an abutment member pivotally mounted on the link and movable thereon to and from a position to be engaged by the cam member, a spring for automatically urging the abutment member to such position, and a latch for locking it out of such position.

5. The combination with a sheet controlling gate having a rock shaft mounting, of a crank arm on the gate, a shaft, a cam member on the shaft, a link connected to the crank arm and having a sliding mounting on the shaft at one side of the cam member, an abutment dog pivoted on the link and having its free end movable to and from a position to be engaged by the cam member, a spring for urging the dog to said position, and a latch for holding it out of such position.

6. The combination with a gate to be operated, of a cam member for operating it, a carrier link having a back and forth movement beside the cam element, and an abutment element mounted on the link adjacent the cam element and being operated thereby to actuate the link, and means mounted on and connecting the link and abutment member for holding the abutment element in different positions on the link and thereby to be engaged or free from the cam element.

7. The combination with a gate to be operated, of a shaft carrying a cam member for operating the gate, a carrier link having a reciprocatory mounting on the shaft and connected to the gate, and an abutment element mounted on the link between its ends and adjacent the cam element and being operated thereby to actuate the link, and means that engages the link for holding the abutment element in different positions on the link and thereby to be engaged or free from the cam element.

In testimony whereof, I affix my signature.

ALBERT BROADMEYER.